United States Patent
Hibara et al.

(10) Patent No.: US 8,780,062 B2
(45) Date of Patent: Jul. 15, 2014

(54) COORDINATE INPUT DISPLAY APPARATUS

(75) Inventors: Naoyuki Hibara, Chiyoda-ku (JP);
Yoshiaki Koizumi, Chiyoda-ku (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 366 days.

(21) Appl. No.: 13/145,204

(22) PCT Filed: Feb. 17, 2010

(86) PCT No.: PCT/JP2010/000986
§ 371 (c)(1),
(2), (4) Date: Jul. 19, 2011

(87) PCT Pub. No.: WO2010/109756
PCT Pub. Date: Sep. 30, 2010

(65) Prior Publication Data
US 2011/0273389 A1 Nov. 10, 2011

(30) Foreign Application Priority Data

Mar. 25, 2009 (JP) ................................. 2009-073590

(51) Int. Cl.
*G06F 3/0488* (2013.01)
(52) U.S. Cl.
USPC ........................................ 345/173; 345/174
(58) Field of Classification Search
USPC ........................................................ 345/173
See application file for complete search history.

(56) References Cited

U.S. PATENT DOCUMENTS

| 5,488,873 | A | 2/1996 | Delmas et al. | |
|---|---|---|---|---|
| 7,020,270 | B1* | 3/2006 | Ghassabian | 379/368 |
| 2003/0210235 | A1 | 11/2003 | Roberts | |
| 2003/0214485 | A1* | 11/2003 | Roberts | 345/173 |
| 2006/0279548 | A1* | 12/2006 | Geaghan | 345/173 |
| 2008/0111788 | A1* | 5/2008 | Rosenberg et al. | 345/156 |
| 2009/0278974 | A1* | 11/2009 | Kuwahara et al. | 348/333.06 |
| 2010/0220065 | A1* | 9/2010 | Ma | 345/173 |

FOREIGN PATENT DOCUMENTS

| CN | 1659583 A | 8/2005 |
|---|---|---|
| JP | 61-292732 A | 12/1986 |

(Continued)

OTHER PUBLICATIONS

Aug. 22, 2013 Chinese First Office Action issued in Chinese Application No. 201080009986.9.

(Continued)

*Primary Examiner* — Lixi C Simpson
(74) *Attorney, Agent, or Firm* — Buchanan Ingersoll & Rooney PC

(57) ABSTRACT

A coordinate input display apparatus is provided in which a reference output of a pressure detection sensor under a non-pressed state is adjusted so as to fall within a predetermined range, and pressed position detection accuracy is improved. The coordinate input display apparatus that includes a plurality of pressure detection sensors and detects a pressed position on a front surface of the apparatus on the basis of a pressure applied to the pressure detection sensors includes: a pressure detection panel in which the pressure detection sensor is disposed; a pressing force transmission unit that is in contact with the pressure detection sensor; and an adjusting screw that adjusts a pressure applied between the pressure detection panel and the pressing force transfer unit.

11 Claims, 7 Drawing Sheets

(56) References Cited

FOREIGN PATENT DOCUMENTS

| | | |
|---|---|---|
| JP | 2-157922 A | 6/1990 |
| JP | 3-269714 A | 12/1991 |
| JP | 4-116744 U | 10/1992 |
| JP | 5-002446 A | 1/1993 |
| JP | 10-134671 A | 5/1998 |
| JP | 2005-524914 A | 8/2005 |
| JP | 2005-526333 A | 9/2005 |
| JP | 2005-284809 A | 10/2005 |

OTHER PUBLICATIONS

Office Action (Notice of Reason for Refusal) dated Dec. 6, 2011, issued in the corresponding Japanese Patent Application No. 2009-073590, and an English Translation thereof. (4 pages).

International Search Report (PCT/ISA/210) issued on May 25, 2010, by Japanese Patent Office as the International Searching Authority for International Application No. PCT/JP2010/000986.

Office Action (Notification of Reasons for Refusal) dated Mar. 6, 2012, issued in the corresponding Japanese Patent Application No. 2009-073590, and an English Translation thereof. (4 pages).

* cited by examiner

COORDINATE INPUT DISPLAY APPARATUS

TECHNICAL FIELD

The present invention relates to a coordinate input display apparatus that inputs data by identifying a coordinate position that is pressed on a touch panel.

BACKGROUND ART

In computers or data processing apparatuses, in order to realize a simple and intuitive operation, an input device that identifies a coordinate position that is pressed on a touch panel and inputs data has been used. A user presses a position corresponding to a button or an icon displayed on a screen so as to input operation information, and then enables to operate intuitively. Furthermore, a designer of the device is able to freely arrange buttons and icons on the screen.

In order to identify a pressed position on a touch panel, devices that detect the pressed position on the basis of a change in a resistance over a resistance film, a change in the electrostatic capacitance, and the like, have been used. However, in these methods, it is necessary to arrange a conductive material, such as a resistance film, on the front of a screen in order to detect the pressed position. For this reason, problems arise in that optical transmission is restricted, and the ease of viewing becomes poor.

On the other hand, there is a method in which a special material is not arranged on the screen, and a pressure detection sensor, such as a distortion gauge, is disposed so as to directly detect a pressure caused by pressing. Since a material that restricts the optical transmission is not arranged, there is a feature that ease of viewing is not decreased.

In such a method in which a pressure is detected to detect a pressed position, a detection value (reference output) output from a pressure detection sensor under a non-pressed state is stored as a reference level, and the actual pressure at the time of pressing is obtained on the basis of the difference between the reference level and the detection value at the time of pressing. Therefore, when the reference output is changed due to mechanical distortion, deterioration with age of a pressure sensor, and the like, there is a problem in that the pressed position cannot be correctly obtained. Accordingly, there is proposed, for example, "a touch position identification method for identifying a touch position of a touch on a touch screen, including a step of obtaining a plurality of reference levels for a force response touch signal; a step of selecting one or more reference levels from among the plurality of reference levels on the basis of the information obtained from the touch signal; and a step of identifying a touch position by using the selected one or more reference levels" (see, for example, Patent Literature 1). In this Patent Literature 1, one or more reference levels are used to compensate for a state that exerts an influence on a touch signal.

CITATION LIST

Patent Literature

Patent Literature 1: Japanese Unexamined Patent Application Publication (Translation of PCT Application) No. 2005-524914 (Claims)

SUMMARY OF INVENTION

Technical Problem

In the method of detecting a pressure and detecting a pressed position, if the reference output under a non-pressed state is changed as described above, it is not possible to correctly obtain the pressed position.

Since the reference output is greatly changed on the basis of, in particular, the installation state of a coordinate input display apparatus, if the installation state is changed, the pressed position to be detected is greatly changed. For example, in a case where the coordinate input display apparatus is disposed with the screen being horizontal and in a case where the coordinate input display apparatus is disposed with the screen being vertical, the reference output is markedly changed due to the self-weight or the like.

In the method of Patent Literature 1 described above, although the accuracy of the touch position can be improved by using one or more reference levels, in order to deal with all the installation states, it is necessary to set the detection range that can be detected by an A/D converter to be wide.

On the other hand, when the detection range of the A/D converter is set wide, a resolution is decreased so that a fine pressure change cannot be detected. Furthermore, in general, outputs of a pressure detection sensor are nonlinear, and there is a problem that if the reference levels differ, the value to be detected is changed with respect to the difference in actual pressure. Also, in the method of Patent Literature 1, position detection accuracy could not be improved in a case where the resolution is decreased so that the reference detection value corresponds to the change or in a case where the output becomes non-linear due to the change of the reference level.

The present invention has been achieved to solve the above-mentioned problems, and it is an object of the present invention to provide a coordinate input display apparatus capable of making adjustments so that the reference output of a pressure detection sensor under a non-pressed state falls within a predetermined range and capable of enhancing pressed position detection accuracy.

Solution to Problem

A coordinate input display apparatus according to the present invention is a coordinate input display apparatus that includes a plurality of pressure detection sensors and detects a pressed position on a front surface of the apparatus on the basis of a pressure applied to the pressure detection sensor, the coordinate input display apparatus including: a sensor support member in which the pressure detection sensors are disposed; a pressing force transmission unit that is in contact with the pressure detection sensor and transmits a pressing force on the front surface of the apparatus; and an adjusting screw that adjusts a pressure applied between the sensor support member and the pressing force transmission unit.

Advantageous Effects of Invention

According to the present invention, the coordinate input display apparatus includes an adjusting screw that adjusts a pressure applied between a sensor support member and a pressing force transmission unit. By making adjustments so that the reference output of the pressure detection sensor falls within a predetermined range under a non-pressed state and a state in which the coordinate input display apparatus has been disposed, it is possible to set a detection range of an A/D converter to be wide and it is possible to enhance pressed position detection accuracy.

DESCRIPTION OF EMBODIMENTS

Embodiment 1

Figure 1:
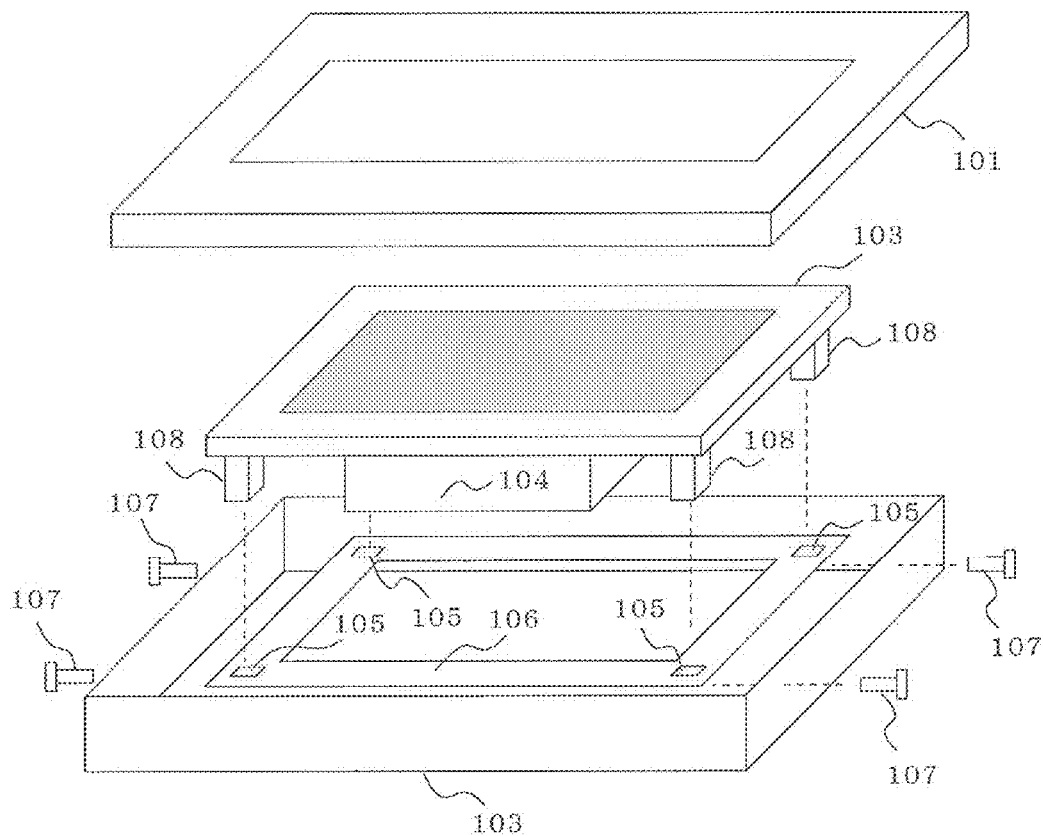
FIG. 1 is a structural view illustrating a configuration of a coordinate input display apparatus in Embodiment 1.

FIG. 1 is a structural view illustrating an example of a configuration of a coordinate input display apparatus according to Embodiment 1 of the present invention. As shown in FIG. 1, a coordinate input display apparatus according to Embodiment 1 includes a front side frame 101, a back side frame 102, a display device 103, a control device 104, a pressure detection sensor 105, a pressure detection panel 106, and an adjusting screw 107. The pressure detection panel 106 includes a sensor support member of the present invention.

The front side frame 101 and the back side frame 102 are each a frame forming the housing of the present coordinate input display apparatus. The display device 103 displays a screen by using a liquid-crystal display device, an organic EL display device, or the like. Furthermore, the display device 103 includes a pressing force transmission unit 108 in a projecting form and is in contact with the pressure detection sensor 105 by way of the pressing force transmission unit 108. The control device 104 performs control of the present coordinate input display apparatus, creates display data, instructs the display device 103 to display the display data, detects a pressed position on the basis of a detection value of the pressure detection sensor 105, and performs an appropriate process in accordance with the pressed position.

The pressure detection panel 106 is a structure in a frame shape, having the pressure detection sensor 105. The pressure detection sensor 105 is disposed on the pressure detection panel 106, is in contact with the pressing force transmission unit 108, and detects a pressure between the pressure detection panel 106 and the pressing force transmission unit 108. The adjusting screw 107 is supported by the back side frame 102, is in contact with the pressure detection panel 106 by a tip end thereof, and changes the pressure between the pressure detection panel 106 and the pressing force transmission unit 108 by fastening or loosening the adjusting screw 107.

Figure 2:
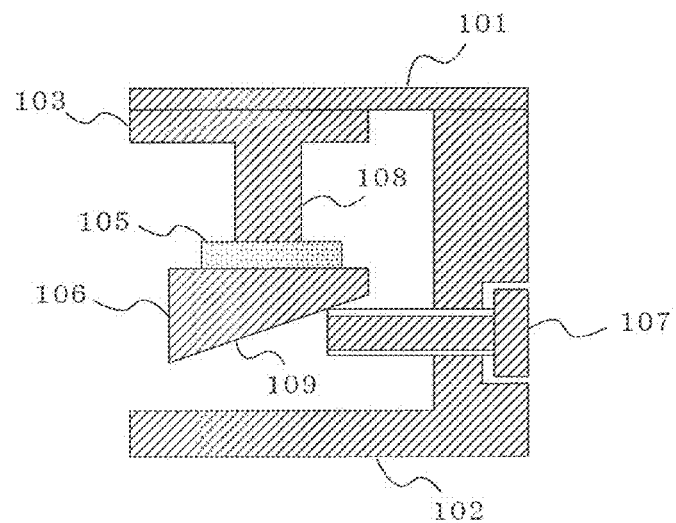
FIG. 2 is a sectional view illustrating the configuration of the coordinate input display apparatus in Embodiment 1.

FIG. 2 is a partial longitudinal sectional view of a coordinate input display apparatus according to Embodiment 1, and illustrates in detail a configuration of the front side frame 101, the display device 103, the pressure detection sensor 105, the pressure detection panel 106, and the adjusting screw 107 with respect to each other.

As shown in FIG. 2, the pressure detection panel 106 has therebelow an inclination unit 109, and the tip end of the adjusting screw 107 is in contact with the inclination unit 109 of the pressure detection panel 106. Since the adjusting screw 107 is supported by the back side frame 102, by fastening the adjusting screw 107, the adjusting screw 107 advances and presses the inclination unit 109 of the pressure detection panel 106, the component force thereof pushes up the pressing force transmission unit 108, and the pressure between the pressure detection panel 106 and the pressing force transmission unit 108 is increased. Similarly, by loosening the adjusting screw 107, the adjusting screw 107 moves back, and the pressure between the pressure detection panel 106 and the pressing force transmission unit 108 is decreased.

Figure 3:
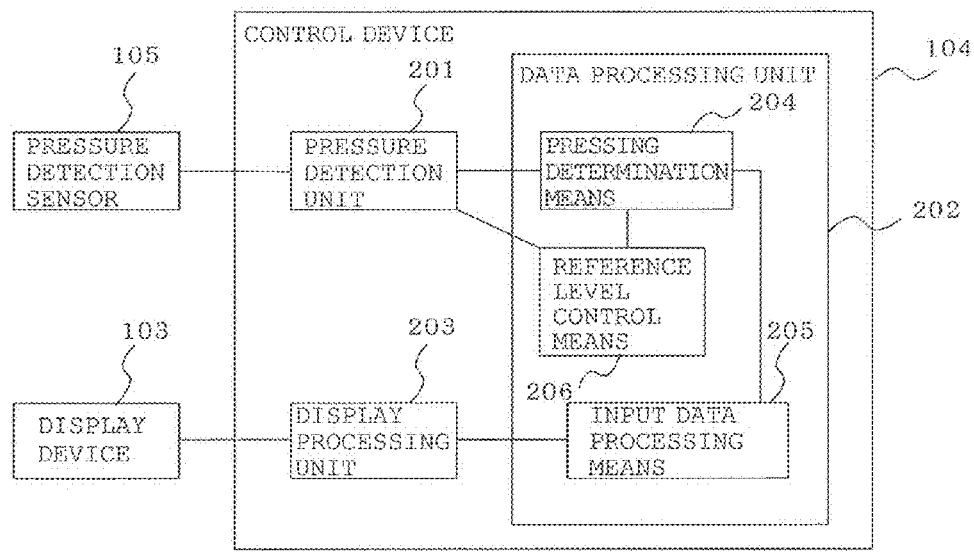
FIG. 3 is a block diagram illustrating a configuration of a control device in Embodiment 1.

FIG. 3 is a block diagram illustrating data processing of the control device 104 of FIG. 1.

The control device 104 includes a pressure detection unit 201, a data processing unit 202, and a display processing unit 203, and the data processing unit 202 includes pressing determination means 204, input data processing means 205, and reference level adjustment means 206.

The pressure detection unit 201 includes an A/D converter (not shown), and converts a voltage value output from the pressure detection sensor 105 into a digital signal. The data processing unit 202 determines the pressed position on the basis of the pressure input from the pressure detection unit 201, and performs a process corresponding to the pressed position. The reference level adjustment means 206 of the data processing unit 202 determines the reference level of the pressure detection on the basis of the output detected by the pressure detection unit 201 and stores the reference level of the pressure detection. The display processing unit 203 controls the screen display by using the display device 103 in accordance with the processing result in the data processing unit 202.

Next, a description will be given of the operation of the coordinate input display apparatus according to Embodiment 1.

The detection of the pressed position by the pressure detection sensor 105 is performed in the following manner.

First, the reference level adjustment means 206 sets an output value (an output value of the pressure detection unit 201) of the pressure detection sensor 105 under a non-pressed state as a reference output, and prestores the reference output as a reference level (the details thereof will be described later).

Figure 4:
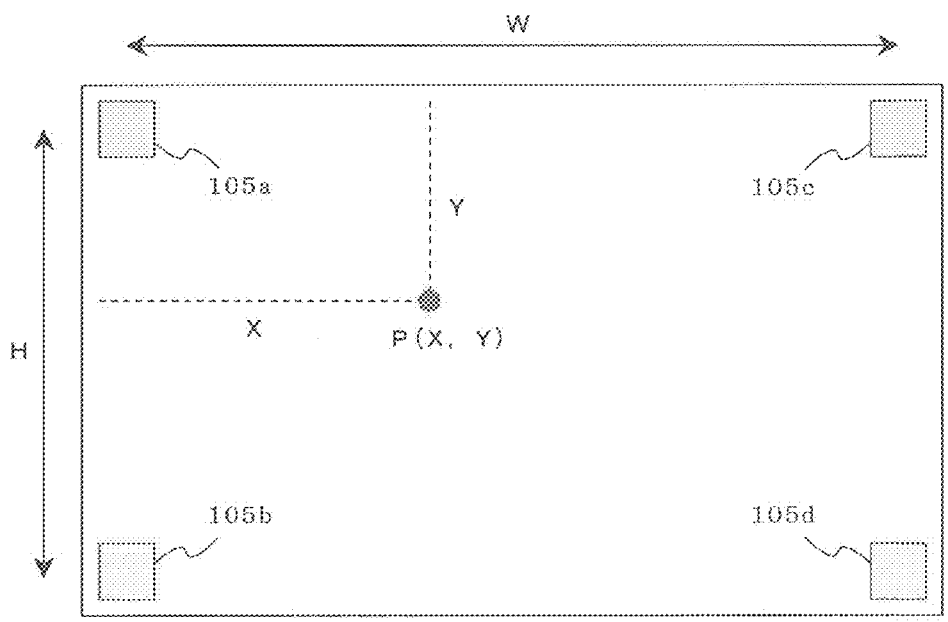
FIG. 4 is a schematic view illustrating an example of the arrangement of pressure detection sensors in Embodiment 1.

The pressing determination means 204 detects the pressure applied to the pressure detection sensor 105 on the basis of the difference between the detection value of the pressure detection sensor 105 and the reference level. Furthermore, the pressing determination means 204 calculates the pressed position on the basis of the pressure detected by the plurality of pressure detection sensors 105. In a case where, for example, as shown in FIG. 4, pressures $F_a$, $F_b$, $F_c$, and $F_d$ are detected by four pressure detection sensors 105a to 105d that are disposed forming a rectangle of a width W and a height H, pressed positions X and Y can be obtained by the following calculation equation.

[Formula 1]

$$X = \frac{F_c + F_d - F_a - F_b}{F_T} W, \quad Y = \frac{F_b + F_d - F_a - F_c}{F_T} H \quad (1)$$

(where $F_T = F_a + F_b + F_c + F_d$)

For the pressure detection sensor 105, for example, a pressure detection sensor that detects a resistance value change by a distortion gauge, a pressure detection sensor that converts an electrostatic capacitance change into a voltage, a piezoelectric element that converts a pressure into a voltage, or the like can be used. By inputting the output voltage of the pressure detection sensor 105 to an A/D converter (not shown) provided in the pressure detection unit 201, it is possible for the control device 104 to obtain the detection value of the pressure detection sensor 105.

Furthermore, after an adjustment is made by amplifying the output value of the pressure detection sensor 105 or applying a bias thereto in accordance with the input specification of the A/D converter, the output value may be input to the A/D converter.

Next, the above-described method of setting a reference level will be described below in detail.

In the present Embodiment 1, the reference output described above is adjusted so as to fall within a predetermined range by using the adjusting screw 107 under a state in which the coordinate input display apparatus is installed at an actual use place. After the adjustment is completed, the reference level adjustment means 206 stores the reference output when the adjustment is completed as a reference level.

In general, an upper limit value and a lower limit value of the output from the pressure detection sensor 105, which can be detected by the A/D converter, a region (detection range) between the upper limit value and the lower limit value, and a resolution are determined by the control based on the amplification and the bias, and the performance of the A/D converter. Furthermore, the detection range and the resolution are in a trade-off relationship, and thus, when the detection range is wide, the resolution becomes low, and when the resolution is high, the detection range becomes narrow.

In the coordinate input display apparatus, it is preferable that the output of the pressure detection sensor 105 under a non-pressed state is set as the lower limit value, and the output of the pressure detection sensor 105 under a maximum pressing pressure that is assumed is set as the upper limit value. By setting the upper limit value and the lower limit value in the manner described above and inputting the values to the A/D converter, it is possible to obtain a high resolution in a detection range necessary for the coordinate input display apparatus.

However, in an actual coordinate input display apparatus, since when a direction in which the coordinate input display apparatus is installed, such as the horizontal direction or the vertical direction, is changed, the reference output is changed due to the weight itself or the like, it is necessary to broaden the detection range of the output of the pressure detection sensor 105, causing the problem that the resolution cannot be set high.

In the present Embodiment 1, in the manner described above, the adjusting screw 107 for adjusting a pressure between the pressing force transmission unit 108 and the pressure detection panel 106 is provided, and after the coordinate input display apparatus is installed in an actual use place, an adjustment is made by using the adjusting screw 107 so that the reference output falls within in a predetermined range, and the reference level is set; thus, it is possible to set the detection range of the output of the pressure detection sensor 105 in accordance with the reference output, and it is possible to set the resolution high.

As described above, by appropriately setting the detection range and the resolution of the pressure detection unit 201, it is possible to enhance the pressed position detection accuracy. Furthermore, as a result of the increase in the detection resolution, it is possible to detect a fine difference in pressing force. By changing the operation content on the basis of the difference in pressure, it is possible to form an interface that is easier to use.

Furthermore, in general, the output of the pressure detection sensor 105 is nonlinear, and when the reference output differs greatly, even though the pressures due to pressing operations are the same, the difference between the reference output and the output value of the pressure detection sensor 105 differs. Therefore, if the value of the reference output differs, the detected position is different. However, in the present Embodiment 1, the adjusting screw 107 is provided, and the reference output is adjusted by using the adjusting screw 107 so that the reference output falls within the predetermined range; thus, it is possible to always obtain the same output irrespective of the installation state.

Regarding the adjustment using the adjusting screw 107, each pressure detection sensor 105 may be provided with one adjusting screw 107, and the pressure of each pressure detection sensor 105 may be individually adjusted, or the pressures of a plurality of pressure detection sensors 105 may be adjusted by using one adjusting screw 107. Furthermore, both the adjusting screw 107 for simultaneously changing pressures of a plurality of pressure detection sensors 105 and the adjusting screw 107 each for individually adjusting pressures of a plurality of pressure detection sensors 105 may be included.

If the reference outputs in the plurality of pressure detection sensors 105 that are disposed in the coordinate input display apparatus differ from one another, the detected position is changed due to the above-mentioned nonlinearity. However, by providing each pressure detection sensor 105 with an adjusting screw 107 and by individually adjusting the pressure, it is possible to make the reference pressures of the plurality of pressure detection sensors 105 the same, and it is possible to enhance the position detection accuracy.

Furthermore, in the present Embodiment 1, when the reference output of each pressure detection sensor 105 is to be adjusted by using the adjusting screw 107, information indicating the degree of the current control may be displayed on a screen of the display device 103. For example, the reference level adjustment means 206 causes the display device 103 to display the current detection value and the set target value of the reference output on the screen, thereby making it possible for the setting worker to adjust the reference output to the predetermined reference output by adjusting the adjusting screw 107 under a non-pressed state while viewing the screen display. Similarly, by changing the color on the screen of the display device 103, the difference between the current detection value and the set target value of the reference output may be displayed.

Figure 5:
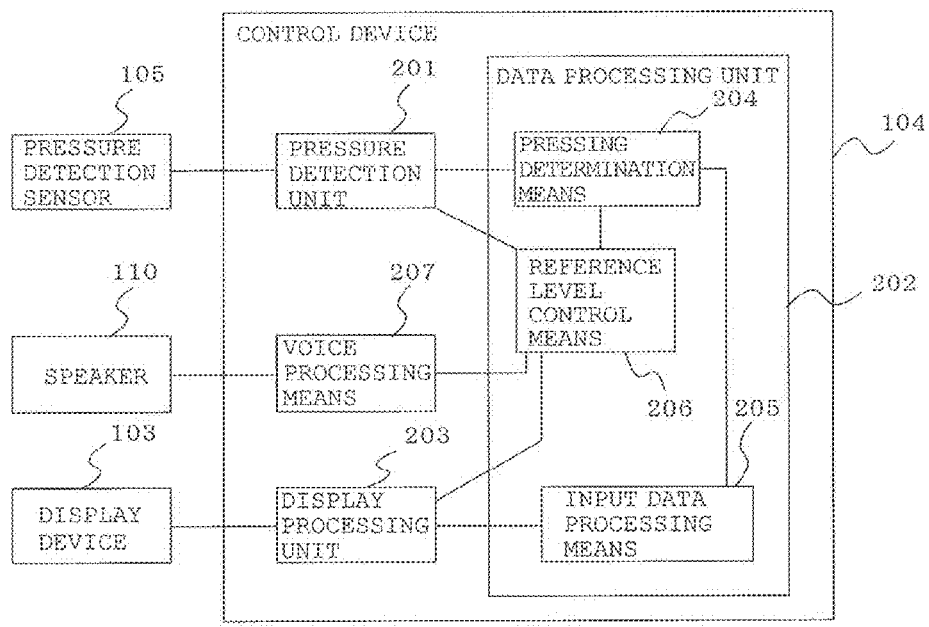
FIG. 5 is a block diagram illustrating a configuration of another example of the control device in Embodiment 1.

Furthermore, as shown in FIG. 5, the coordinate input display apparatus may include the speaker 110, and when the reference output of each pressure detection sensor 105 is to be adjusted by using the adjusting screw 107, the reference level adjustment means 206 may change the interval in which sound is generated, the pitch of sound, and the like on the basis of the difference between the current detection value and the set target value of the reference output. For example, if a beep sound is produced at a long interval in a case where the difference between the current detection value and the set target value of the reference output is large and the interval of the beep sound becomes short as the value approaches by each adjustment, it is possible for the setting worker to hear the sound so as to determine whether the value has approached to the desired set value or not. A voice may be output.

By presenting the difference between the current detection value and the reference output value by using the screen display or sound in the manner described above, it is possible to easily perform the adjustment of the reference output.

Furthermore, although in the present Embodiment 1, the adjusting screw 107 is brought into contact with the inclination unit 109 of the pressure detection panel 106, it may be acceptable that the display device 103 has the inclination unit 109, and the adjusting screw 107 and the inclination unit 109 of the display device 103 are brought into contact with each other, so that the pressure between the pressure detection sensor panel and the display device 103 is changed by using the adjusting screw 107.

Figure 6:
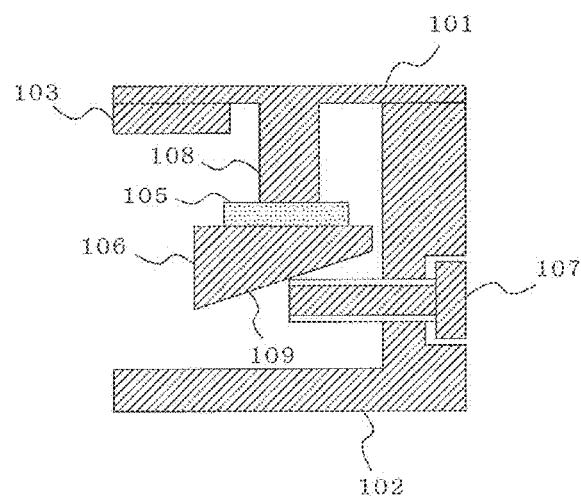
FIG. 6 is a sectional view illustrating a configuration of another example of the coordinate input display apparatus in Embodiment 1.

Furthermore, in the present Embodiment 1, although the pressing force transmission unit 108 is provided in the display device 103, as shown in FIG. 6, even when the pressing force transmission unit 108 is provided in a portion, such as the front side frame 101, from which the pressing force on the screen can be transferred, similar effects can be obtained.

Figure 7:
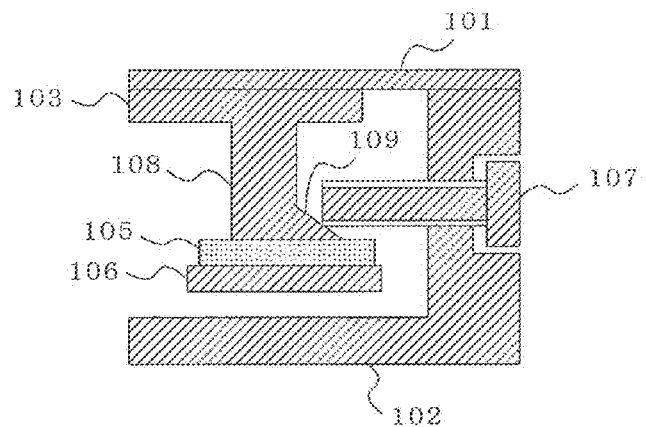
FIG. 7 is a sectional view illustrating a configuration of another example of the coordinate input display apparatus in Embodiment 1.
Figure 8:
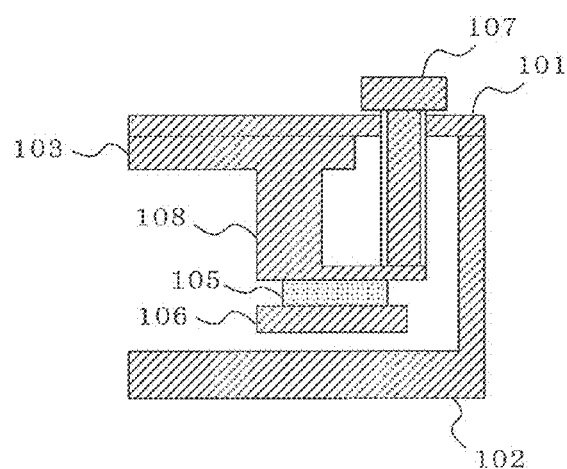
FIG. 8 is a sectional view illustrating a configuration of another example of the coordinate input display apparatus in Embodiment 1.
Figure 9:
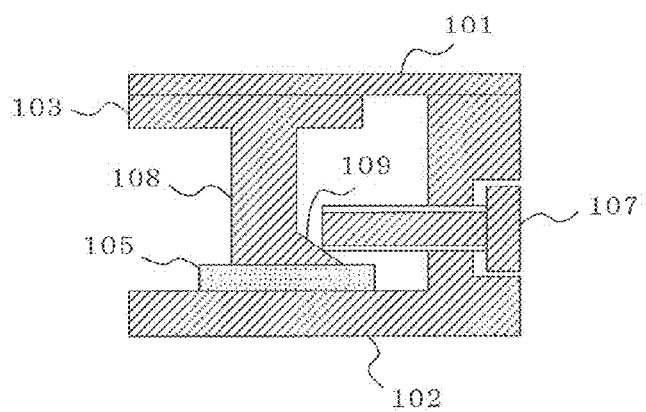
FIG. 9 is a sectional view illustrating a configuration of another example of the coordinate input display apparatus in Embodiment 1.

Furthermore, in the present Embodiment 1, although the adjusting screw 107 is arranged so as to be supported by the back side frame 102 and the tip end of the adjusting screw 107 is brought into contact with the pressure detection panel 106 provided with the inclination unit 109 and is arranged so as to be adjusted from a side surface, the arrangement may be made as shown in FIGS. 7, 8 and 9. For example, in the example of FIG. 7, the pressing force transmission unit 108 provided with the inclination unit 109 is brought into contact with the adjusting screw 107. In the example of FIG. 8, the adjusting screw 107 is supported by the front side frame 101, and the tip end of the adjusting screw 107 is brought into contact with a plane unit provided in the pressing force transmission unit 108. Alternatively, in the example of FIG. 9, the pressure detection sensor 105 is arranged in the back side frame (sensor support member) 102. With such an arrangement, a pressure applied to the pressure detection sensor 105 may be changed by using the adjusting screw 107.

Furthermore, the pressing determination means 204 may determine whether no pressing operation has been performed for a predetermined time period or not, and when the pressing determination means 204 determines that no pressing operation has been performed for the predetermined time period, the reference level adjustment means 206 may restore the output of the pressure detection sensor 105 at that point in time that is the reference output as the reference level.

The output of the pressure detection sensor 105 is gradually changed due to deterioration of the pressure detection sensor 105 and mechanical distortion of the housing, and other changes with time, and the detection accuracy of the pressed position is decreased. When the pressing determination means 204 determines that a pressing operation has not been performed for a preset predetermined time period, the reference level adjustment means 206 restores the output of the pressure detection sensor 105 at that point in time that is the reference output as the reference level, which enables to avoid the decrease of the detection accuracy of the pressed position due to such deterioration with age.

The pressing determination means 204 determines the following cases as being abnormal: a case where the detected pressure has changed considerably compared with the assumed pressing pressure, a case where a state in which there is a difference in the reference level greater than or equal to a predetermined value continues for a certain period of time, and a case in which the detected pressure has become negative. When the abnormality is determined, a warning to the user by using the display device 103 and the speaker 110 may be present.

In the case where the determination of the abnormality is made as described above, it is possible to quickly tell the abnormality to the user by presenting a warning. Furthermore, by presenting the warning, it is possible to prompt the user to perform the adjustment of the reference output by using the adjusting screw. Also, when the installed place or the like is moved, since a similar abnormality is determined, it is possible to prompt the user to perform the adjustment of the reference output by using the adjusting screw once more in a similar manner.

Embodiment 2

Figure 10:
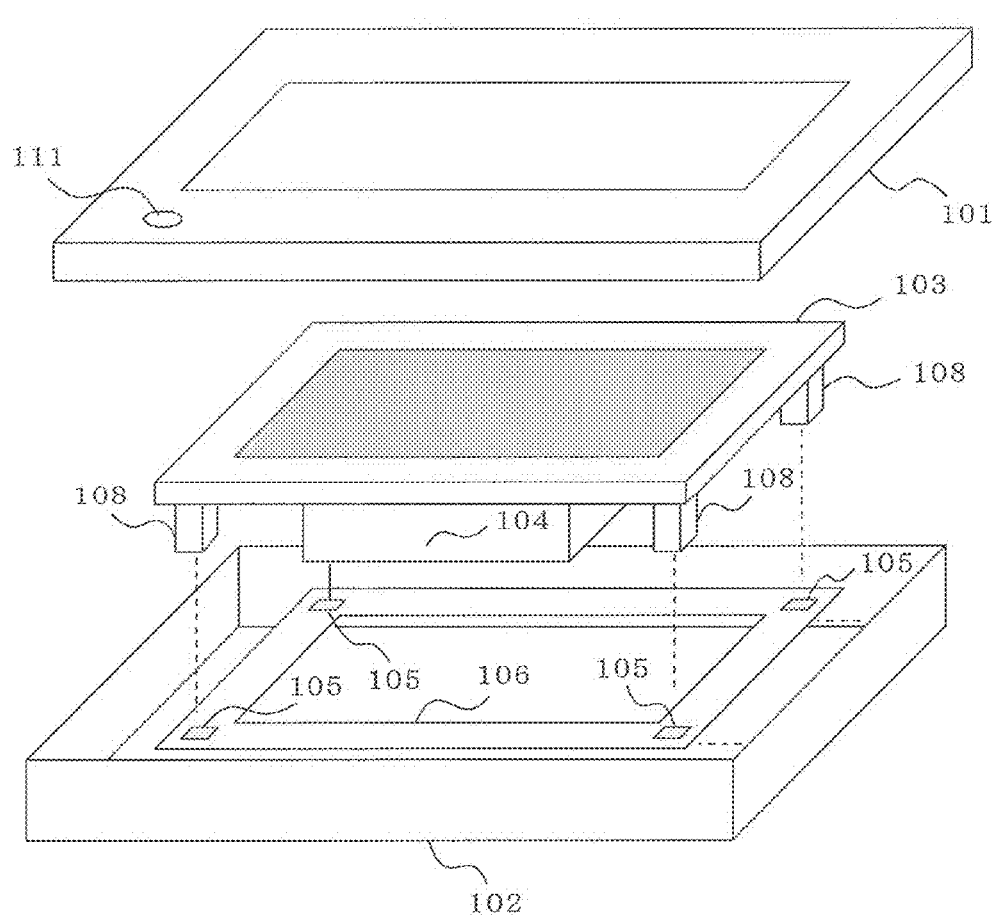
FIG. 10 is a structural view illustrating a configuration of a coordinate input display apparatus in Embodiment 2.

FIG. 10 is a structural view illustrating an example of a configuration of a coordinate input display apparatus according to Embodiment 2 of the present invention.

As shown in FIG. 2, the coordinate input display apparatus according to Embodiment 2 includes the front side frame 101, the back side frame 102, the display device 103, the control device 104, the pressure detection sensor 105, the pressure detection panel 106, and the reference level setting button 111.

The front side frame 101 and the back side frame 102 are each a frame forming the housing of the present coordinate input display apparatus. The display device 103 displays a screen by using a liquid-crystal display device, an organic EL display device, or the like. Furthermore, the display device 103 has a pressing force transmission unit 108 in a projecting form, and is in contact with the pressure detection sensor 105 by way of the pressing force transmission unit 108. The control device 104 controls this coordinate input display apparatus, creates display data, instructs the display device 103 to display the display data, detects a pressed position on the basis of a detection value of the pressure detection sensor 105, and performs an appropriate process on the basis of the pressed position.

The pressure detection panel 106 is a structure for holding the pressure detection sensor 105. The pressure detection sensor 105 is in contact with the pressing force transmission unit 108 disposed on the pressure detection panel 106, and detects a pressure between the pressure detection panel 106 and the pressing force transmission unit 108. The reference level setting button 111 is operated in the reference level control by a user. A configuration of data processing of the control device 104 is the same as that of Embodiment 1.

In the present Embodiment 2, in the adjustment of the reference level by the reference level adjustment means 206, the output of the pressure detection sensor 105 under a non-pressed state is stored as a first reference level, the output of the pressure detection sensor 105 when the setting worker presses the reference level setting button 111 with pressing every predetermined pressing point on the front surface of the apparatus is stored as a second reference level, and a pressing detection level and a pressure conversion coefficient are calculated on the basis of the first reference level and the second reference level to store.

When the output of the pressure detection sensor exceeds said pressing detection level, the pressing determination means 204 determines that the front surface of the apparatus has been pressed, and detects the pressure applied to each pressure detection sensor 105 and the pressed position on the basis of the output value of the pressure detection sensor 105 in accordance with the pressure conversion coefficient.

Figure 11:
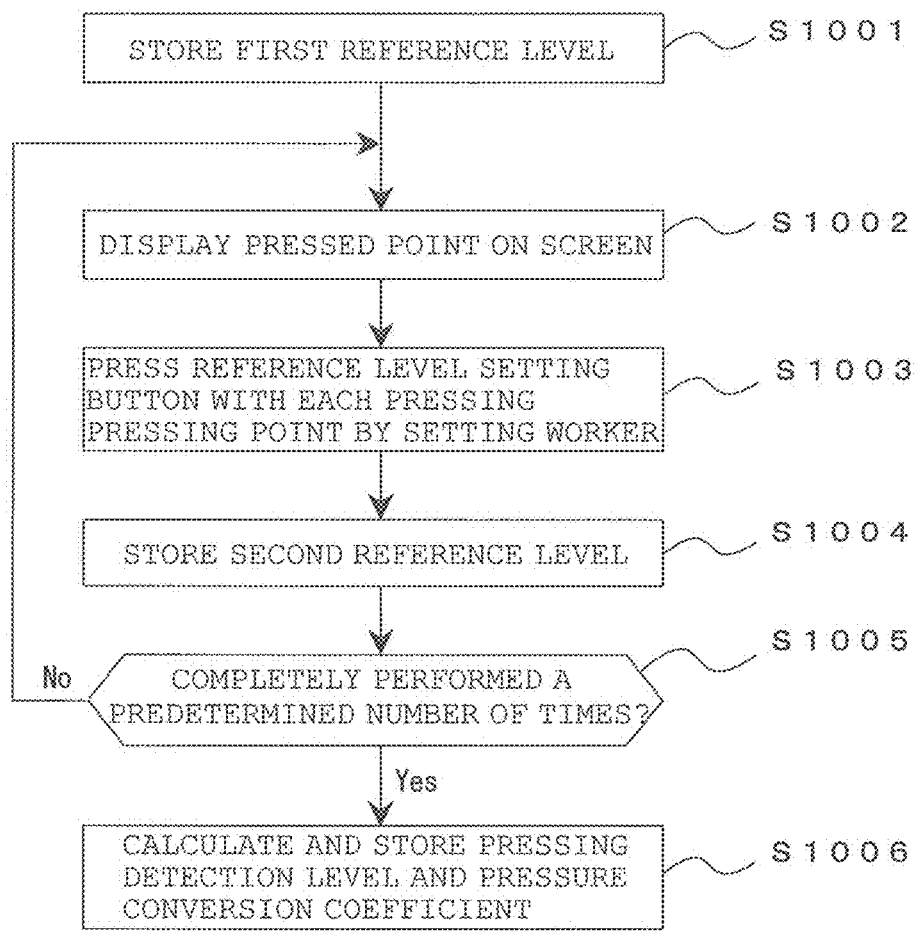
FIG. 11 is a flowchart illustrating a reference level control procedure in Embodiment 2.

More specifically, the adjustment of the reference level is performed on the basis of the procedure shown in FIG. 11.

First, under a non-pressed state, the reference level adjustment means 206 stores the output of the pressure detection sensor 105 as the first reference level (S1001).

Next, the reference level adjustment means 206 sets a pressing point, and makes the display device 103 to display the pressing point (S1002).

The user performing setting presses the reference level setting button 111 while pressing the position in accordance with the pressing point displayed on the screen (S1003).

The reference level adjustment means 206 stores the output of the pressure detection sensor 105 at this time as the second reference level (S1004).

The display of the pressing point, and the pressing of the pressing point and the reference level setting button 111 by the setting worker are repeated a predetermined number of times (S1005).

The reference level adjustment means 206 calculates the pressing detection level and the pressure conversion coefficient to store (S1006).

The pressing detection level ($F_p$) is calculated as, for example, a value such that the difference between the first reference level $F_1$ and the second reference level $F_p$ is multiplied by a predetermined ratio K, as shown in the following Expression (2).

[Formula 2]

$$F_p = K(F_2 - F_1) \quad (2)$$

Furthermore, the pressure conversion coefficient is calculated as, for example, in the following manner.

In a case where (X, Y) is set as a pressing point, the relationship between a theoretical pressure when the pressing point is pressed and the pressing point (X, Y) is represented as the same relationship as that of Expression (2) above. For this reason, the reference level adjustment means 206 calculates a regression coefficient on the basis of the theoretical pressure and the detection value stored as the second reference level, which enables to obtain a pressure conversion coefficient at which the output of each pressure detection sensor 105 is converted into a pressure that is actually applied.

The pressing determination means 204 calculates the pressure that is actually applied on the basis of the output of the pressure detection sensor 105 and said pressure conversion coefficient, and calculates the pressed position.

The above-described calculation of the regression coefficient may be calculated as a straight line or may be calculated by a nonlinear function.

As described above, in the adjustment of the reference level by the reference level adjustment means 206, on the basis of the output of the pressure detection sensor 105 under the state in which the setting worker has pressed the reference level setting button 111 with pressing every pressing point, the pressing detection level or the pressure conversion coefficient is calculated and stored; thus, it is possible to appropriately calculate the actual pressure in accordance with the installed place and the pressure at which the user presses, and it is possible to improve the position detection accuracy. Furthermore, the occurrence of error detection can be decreased.

The adjustment of the reference level in the present Embodiment 2 may be performed in combination with the adjustment of the adjusting screw in the above-described Embodiment 1. After the adjustment of the reference level is made by using the adjusting screw, it is possible to further improve the position detection accuracy by setting the pressing detection level and the pressure conversion coefficient.

Embodiment 3

Figure 12:
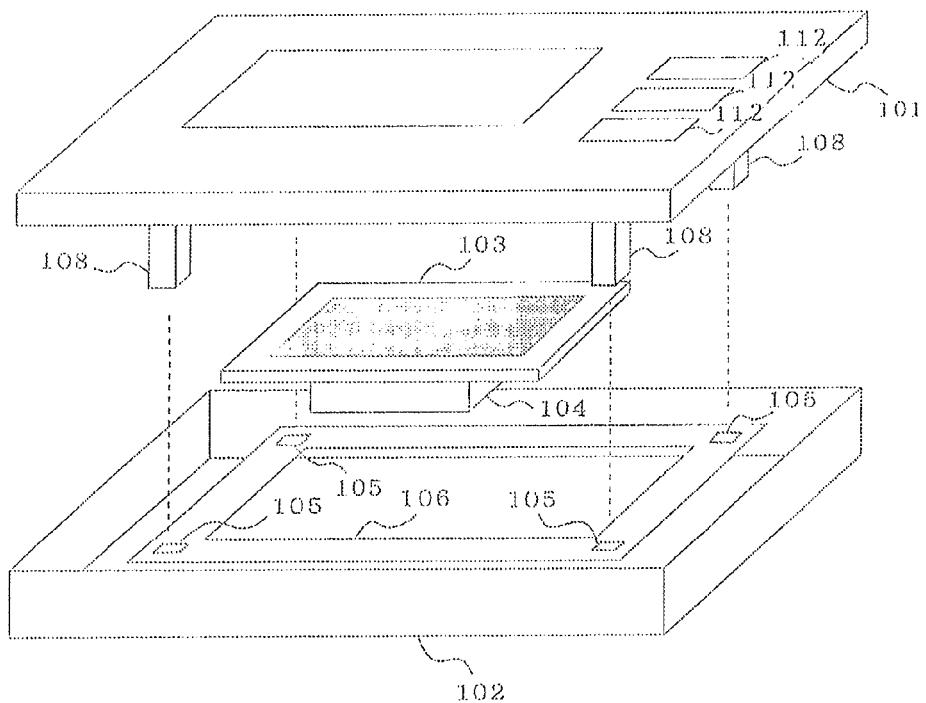
FIG. 12 is a block diagram illustrating a configuration of a coordinate input display apparatus in Embodiment 3.

FIG. 12 is a structural view illustrating an example of the configuration of a coordinate input display apparatus in Embodiment 3 of the present invention. As shown in FIG. 12, the coordinate input display apparatus according to Embodiment 3 includes the front side frame 101, the back side frame 102, the display device 103, the control device 104, the pressure detection sensor 105, and the pressure detection panel 106, with an operation button 112 being provided in the front side frame 101.

The front side frame 101 and the back side frame 102 are each a frame forming the housing of the present coordinate input display apparatus, and the front side frame 101 further includes the operation button 112. Furthermore, the front side frame 101 has the pressing force transmission unit 108 in a projecting form, and is in contact with the pressure detection sensor 105 by way of the pressing force transmission unit 108. The display device 103 displays a screen by using a liquid-crystal display device, an organic EL display device, or the like. The control device 104 performs control of the present coordinate input display apparatus, creates display data, instructs the display device 103 to display the display data, detects a pressed position on the basis of the detection value of the pressure detection sensor 105, and performs an appropriate process on the basis of the pressed position.

The pressure detection panel 106 is a structure for holding the pressure detection sensor 105. The pressure detection sensor 105 is disposed on the pressure detection panel 106, is in contact with the pressing force transmission unit 108, and detects a pressure between the pressure detection panel 106 and the pressing force transmission unit 108.

In the present Embodiment 3, operation detection means of the operation button 112, such as a switch, which corresponds to the operation button 112 included in the front side frame 101, is not provided, the pressed position on the front side frame 101 is detected by the pressure detection sensor 105, and the pressing of the operation button 112 is determined.

Figure 13:
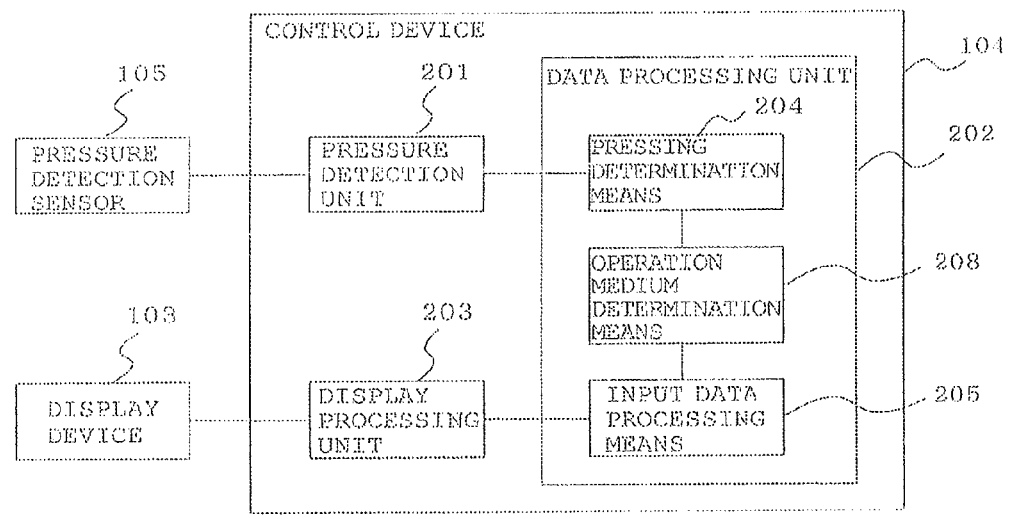
FIG. 13 is a structural view illustrating a control device in Embodiment 3.

FIG. 13 is a structural view illustrating a configuration of data processing in the control device 104.

The control device 104 includes the pressure detection unit 201, the data processing unit 202, and the display processing unit 203, and the data processing unit 202 includes pressing determination means 204, operation medium determination means 208, and input data processing means 205.

When the operation medium determination means 208 receives pressed position information from the pressing determination means 204, the operation medium determination means 208 determines whether a screen unit on the front side frame 101 has been pressed or the operation button 112 has been pressed on the basis of the pressed position. Then, in the case where it is determined that the screen unit has been pressed, a process appropriate for the corresponding pressed position on the screen is performed, and when it is determined that the operation button 112 has been pressed, a process corresponding to the pressing of the operation button 112 is performed.

As described above, the pressure detection sensor 105 detects the pressed position on the front side frame 101 and makes a determination as to the pressing of the operation button 112, making it possible for the user not only to perform a pressing operation on the screen but also to perform an operation using the operation button 112.

In the operation using the touch panel of the operation screen displayed on the screen, since a portion for which operation is possible and a portion for which operation is not possible on the operation screen are shown only by the screen display, there is a drawback that it is difficult for the user to determine where operation is possible. According to the present invention, since not only a pressing operation on the operation screen but also an operation by a physical button is possible, for example, a function used frequently is assigned to the operation button 112, and an elaborate operation is assigned to an operation unit displayed on the screen, which enable to provide users with an easier interface to use.

Furthermore, the operation button 112 does not need detection means, such as an actual switch, and thus, the number of parts can be reduced. Furthermore, the operation button hardly fails compared with an input device constituted by detection means, such as a physical switch.

Furthermore, the adjusting screw 107 described in Embodiment 1 may be included. Similarly to Embodiment 1, by adjusting the reference output by using the adjusting screw 107 without depending on the installed position, it becomes possible to perform detection of the pressed position with high accuracy.

The operation button 112 arranged on the front side frame 101 in the present Embodiment 3 may have a figure indicating the operation button 112 depicted on the front side frame 101, or may have a seal pasted thereon and, in addition, may have an elastic body so that the button is displaced by an operation and is returned when the operation is completed. The touch panel has a drawback that there is no tactile sense of operation when a pressing operation is performed on the touch panel, and it is difficult to understand whether an operation could actually be performed. As a result of including a physical button having an elastic body as described above, it is possible to provide users with tactile sense of operation.

INDUSTRIAL APPLICABILITY

The coordinate input display apparatus according to the present invention can be used as an operation screen of a facility apparatus, such as an operating device in, for example, an air-conditioning apparatus, an illumination device, a water heater, a security monitoring device, and an operational device in a factory. Furthermore, the coordinate input display apparatus can be used as an operation screen of a general-purpose computer, a mobile terminal, a car navigation system, or the like. In particular, the coordinate input display apparatus is useful in a case where the coordinate input display apparatus is installed in a wall surface or the like, and hardly move once the coordinate input display apparatus is installed.

REFERENCE SIGNS LIST 101 front side frame, 102 back side frame, 103 display device, 104 control device, 105, 105a to 105c pressure detection sensor, 106 pressure detection panel, 107 adjusting screw, 108 pressing force transmission unit, 109 inclination unit, 110 speaker, 111 reference level setting button, 112 operation button, 201 pressure detection unit, 202 data processing unit, 203 display processing unit, 204 pressing determination means, 205 input data processing means, 206 reference level adjustment means, 207 voice processing unit, 208 operation medium determination means

The invention claimed is:

1. A coordinate input display apparatus that includes a plurality of pressure detection sensors and detects a pressed position on a front surface of the apparatus on the basis of a pressure applied to said pressure detection sensors, the coordinate input display apparatus comprising:
   a sensor support member in which said pressure detection sensors are disposed;
   a pressing force transmission unit that is in contact with said pressure detection sensors and transmits a pressing force on the front surface of the apparatus; and
   an adjusting screw that adjusts a pressure applied between said sensor support member and said pressing force transmission unit.

2. The coordinate input display apparatus of claim 1, wherein said sensor support member or said pressing force transmission unit includes an inclination unit, and
   wherein said adjusting screw has a tip end thereof engaged with said inclination unit and adjusts said pressure.

3. The coordinate input display apparatus of claim 1, further comprising:
   reference level adjustment means for storing a reference level serving as a reference for pressure detection; and
   pressing determination means for obtaining a pressure applied to said pressure detection sensors on the basis of the difference between an output of said pressure detection sensors and said reference level.

4. The coordinate input display apparatus of claim 3, wherein said reference level adjustment means stores, as a reference level, the output of said pressure detection sensors when the output of said pressure detection sensors under a non-pressed state is adjusted so as to fall within a predetermined range by using an adjusting screw.

5. The coordinate input display apparatus of claim 4, wherein when an adjustment is to be made using said adjusting screw, said reference level adjustment means changes the display of a display screen in accordance with the difference between said predetermined range and the current output of said pressure detection sensors.

6. The coordinate input display apparatus of claim 4, wherein when an adjustment is to be made using said adjusting screw, said reference level adjustment means changes pitch of sound, an interval in which sound is generated, or a voice in accordance with the difference between said predetermined range and the current output of said pressure detection sensors.

7. The coordinate input display apparatus of claim 3, wherein said pressing determination means determines whether no pressing operation has been performed on the front surface of the apparatus for a predetermined time period, and
   when it is determined that no pressing operation has been performed on the front surface of the apparatus for the predetermined time period, said reference level adjustment means stores once more the output of said pressure detection sensors at the time of the determination as the reference level.

8. The coordinate input display apparatus of claim 7, wherein the pressing determination means determines an abnormality in a case where the output of said pressure detection sensors exceeds the predetermined range and, when determining the abnormality, shows the occurrence of abnormality using a display, a sound, or a voice.

9. A coordinate input display apparatus that includes a plurality of pressure detection sensors and detects a pressed position on a front surface of the apparatus on the basis of a pressure applied to the pressure detection sensors, the coordinate input display apparatus comprising:

pressing determination means for determining the pressed position on the basis of the output of said pressure detection sensors;

a reference level setting button used to adjust a reference level; and reference level adjustment means, wherein said reference level adjustment means stores the output of the pressure detection sensors under a non-pressed state as a first reference level, and stores, as a second reference level, the output of said pressure detection sensors under a state in which said reference level setting button is pressed while the front surface of the apparatus is pressed.

10. The coordinate input display apparatus of claim 9, wherein said reference level adjustment means calculates and stores a pressing detection level on the basis of the first reference level and the second reference level, and wherein said pressing determination means calculates the pressed position in a case where the output of said pressure detection sensors becomes greater than said pressing detection level.

11. The coordinate input display apparatus of claim 9, wherein said reference level adjustment means calculates and stores a pressure conversion coefficient on the basis of the first reference level and the second reference level, and wherein said pressing determination means calculates the pressed position on the basis of said pressure conversion coefficient.

\* \* \* \* \*